United States Patent [19]
Kishimoto

[11] Patent Number: 5,062,592
[45] Date of Patent: Nov. 5, 1991

[54] ORIENTATION CONTROL APPARATUS FOR SPACE VEHICLE

[75] Inventor: Hitoshi Kishimoto, Yokohama, Japan

[73] Assignee: Kabushiki Kaisha Toshiba, Kawasaki, Japan

[21] Appl. No.: 507,467

[22] Filed: Apr. 11, 1990

[30] Foreign Application Priority Data

Apr. 14, 1989 [JP] Japan .................................. 1-94879

[51] Int. Cl.$^5$ .............................................. B64G 1/24
[52] U.S. Cl. .................... 244/164; 244/171; 244/165; 342/352; 342/355; 342/357
[58] Field of Search ............... 244/165, 164, 171, 173, 244/176; 342/352-358

[56] References Cited

U.S. PATENT DOCUMENTS

| | | | |
|---|---|---|---|
| 3,757,336 | 9/1973 | Rosen | 342/354 |
| 3,818,767 | 6/1974 | Donohue et al. | 244/165 |
| 4,078,748 | 3/1978 | Sen | 244/165 |
| 4,687,161 | 8/1987 | Plescia et al. | 342/355 |
| 4,776,540 | 10/1988 | Westerlund | 244/164 |

FOREIGN PATENT DOCUMENTS 2601159  1/1988  France ............................ 244/171

OTHER PUBLICATIONS

F. F. Mobley, "The SAS-3 Attitude Control System", 1975, APL Technical Digest, vol. 14, No. 3.
R. E. Roberson, "Where Do We Stand on Attitude Control", Aviation Age, R & D Handbook, 1959, pp. B5-B10.

Primary Examiner—Joseph F. Peters, Jr.
Assistant Examiner—Christopher P. Ellis
Attorney, Agent, or Firm—Oblon, Spivak, McClelland, Maier & Neustadt

[57] ABSTRACT

A first orientation control system controls the orientation of the main body of a satellite so that the main body is oriented toward the center of the Earth, and a second orientation control system controls the orientation of an antenna so that the antenna is continuously directed toward a target (e.g., a satellite revolving around the Earth). Between these two control systems, there is inevitably mutual interference, due to dynamic effects. To prevent this mutual interference, the first control system controls the orientation of the main body of the satellite on the basis of antenna driving information of the second orientation control system, while the second control system corrects the antenna driving information on the basis of orientation error information of the first control system.

5 Claims, 6 Drawing Sheets

ORIENTATION CONTROL APPARATUS FOR SPACE VEHICLE

BACKGROUND OF THE INVENTION

1. Field of the Invention

The present invention relates to an orientation control apparatus for controlling the orientation of a space vehicle, such as an artificial satellite.

2. Description of the Related Art

In general, an artificial satellite is equipped with an antenna. With this antenna, the satellite body is controlled such that it maintains a predetermined orientation with reference to the Earth, and simultaneously, the antenna of the satellite is controlled such that it is directed toward an Earth station or toward a certain target object (e.g., another artificial satellite). (The latter control should be referred to accurately as directivity control, but the directivity control will be described herein as one of orientation controls, for the purpose of simplicity.) If the orientation of the satellite body is varied, the orientation of the antenna is also varied, accordingly. Conversely, if the orientation of the antenna is varied, the orientation of the main body is also varied, due to the dynamic effects caused by the antenna orientation control. In a conventional orientation control apparatus, therefore, the control band of an antenna orientation control system is kept sufficiently apart from that of a satellite body orientation control system, in order that the antenna orientation control system does not interfere with the satellite body orientation control system due to the dynamic effects. This measure is taken not only for the antenna orientation control system but also for the orientation control system for another device provided for the satellite, e.g., a solar paddle. Further, a similar measure is taken in another type of space vehicles, such as a space station.

It is difficult to provide a large-sized device for a space vehicle, if the device requires orientation control. In recent years, there is a tendency to launch larger satellites than before. In accordance with this tendency, larger antennas have come to be employed for the satellites. If the antenna employed for a satellite is large, the driving mechanism for the antenna must naturally output a large driving force. If the driving force is large, the dynamic effects acting on the satellite body inevitably increase. In addition, the unnecessary power consumption in the driving mechanism increases. Therefore, there are many restrictions regarding the employment of a large-sized antenna, and the orientation control system used for such an antenna must be designed and manufactured in consideration of the restrictions. In the prior art, therefore, it is difficult to employ a large-sized antenna for a space vehicle.

SUMMARY OF THE INVENTION

Accordingly, an object of the present invention is to provide an orientation control apparatus for a space vehicle, which has a simple construction and yet reliably prevents interference between the orientation control system used for the space vehicle and that used for a device provided for the space vehicle, which is easy to design and manufacture, and which allows the employment of a large-sized device.

To achieve this object, the present invention provides an orientation control apparatus, which comprises:

a first orientation control system (4) for controlling the orientation of a main body (1) of the space vehicle on the basis of information ($S\theta_B$) representing a variation in the orientation of the main body (1);

a second orientation control system (5) for controlling the orientation of a device (2) provided for the main body on the basis of information ($S\theta_A$) representing a variation in the orientation of the device (2);

first compensation means for: estimating a target directivity direction of the device (2); estimating an orientation error ($S\hat{\theta}_{APM}$) of the device (2) on the basis of the information representing the estimated target directivity direction ($S\hat{\theta}_{REF}$) and of the information ($S\hat{\theta}_B$) representing a variation in the orientation of the main body (1); and correcting the operation of the second orientation control system on the basis of the estimated orientation error ($S\hat{\theta}_{APM}$), to thereby compensating for dynamic effects which the first orientation control system may have on the second orientation control system; and second compensation means for correcting the operation of the first orientation control system (4) on the basis of the estimated orientation error ($S\hat{\theta}_{APM}$), to thereby compensating for dynamic effects which the second orientation control system (5) may have on the first orientation control system (4) when the first compensation performs compensation.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

An embodiment of the present invention will now be described, with reference to the accompanying drawings.

Figure 1:
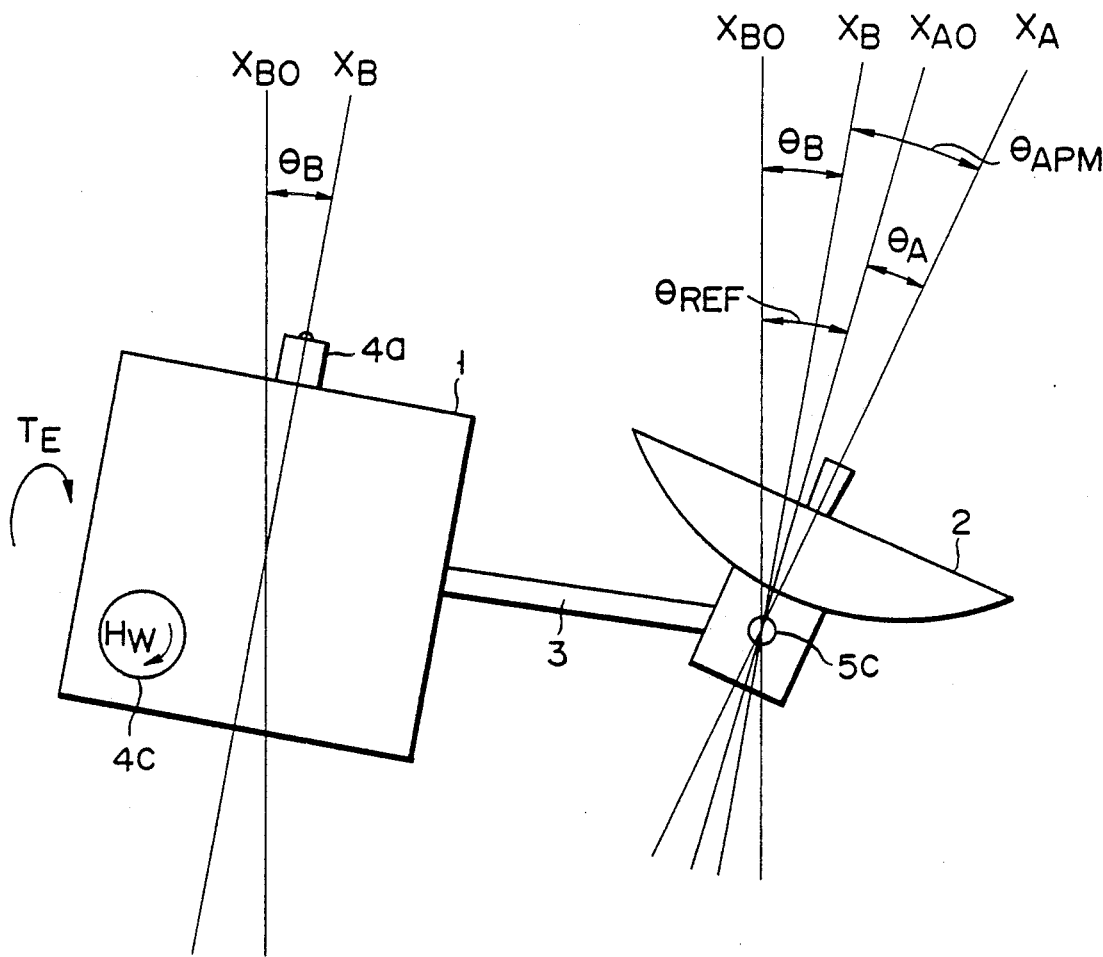
FIG. 1 is a view illustrating the construction of an artificial satellite to which an orientation control apparatus according to the present invention is applied.

FIG. 1 illustrates the construction of an artificial satellite to which an orientation control apparatus according to the present invention is applied. It is assumed that the artificial satellite is a geostationary satellite and performs communication with satellites revolving in a low Earth orbit.

Figure 2:
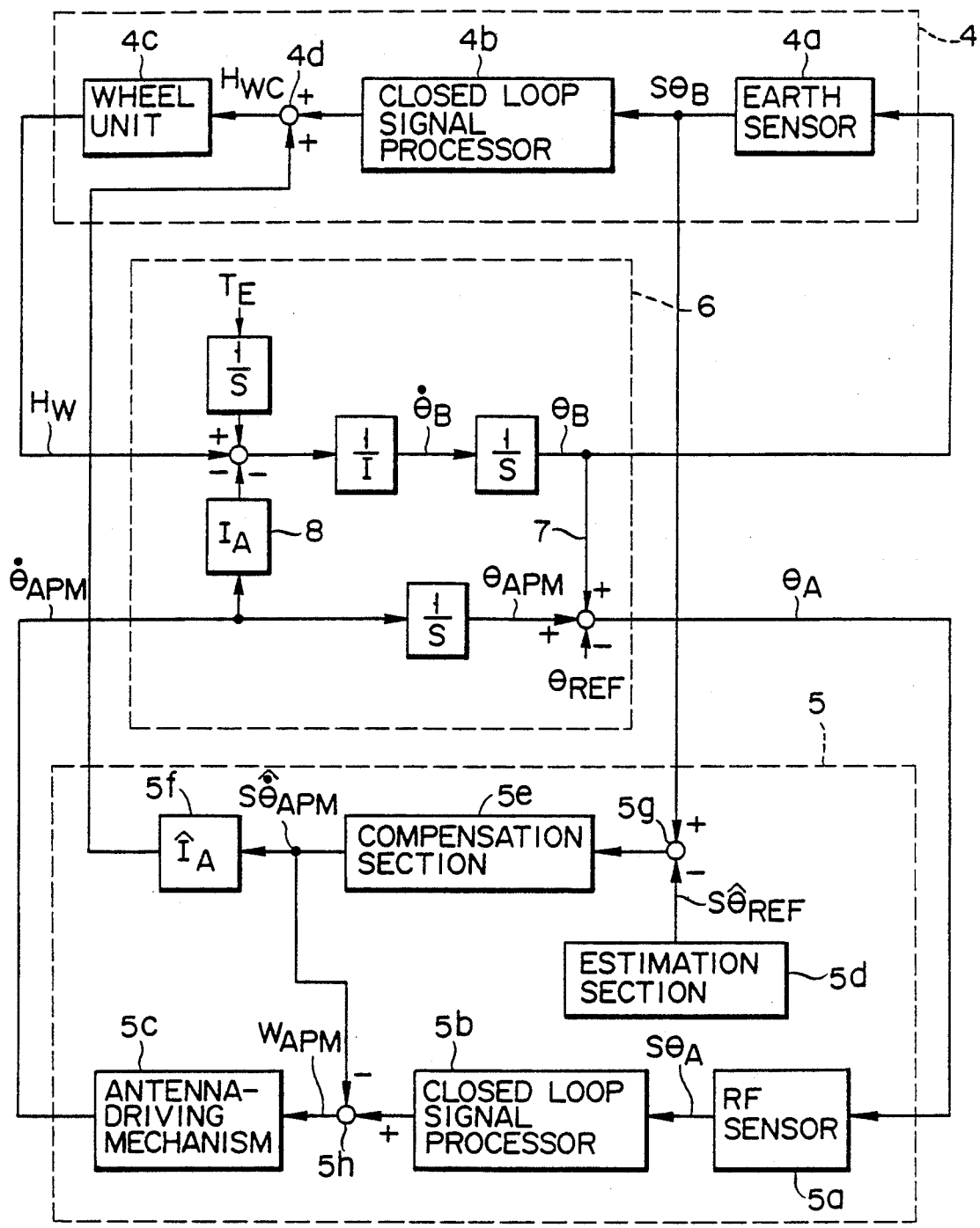
FIG. 2 is a block diagram showing the circuit arrangement of an orientation control apparatus according to the first embodiment of the present invention.

Referring to FIG. 1, a satellite body 1 and an antenna 2 are coupled together by means of a shaft 3. The satellite body 1 has a reference axis $X_B$ which should be coincide with an Earth center direction axis $X_{B0}$ (i.e., an axis directed toward the center of the Earth). Likewise, the antenna 2 has a directivity direction axis $X_A$ which should be coincide with a target direction axis $X_{A0}$. Since, in this embodiment, the target to which the antenna 2 should be directed is a revolving satellite, the target direction axis $X_{A0}$ continuously changes with time. Therefore, an orientation control system 4 for the satellite body 1 and that 5 for the antenna 2 are provided independently of each other, as is shown in FIG. 2.

First, the orientation control system 4 for the satellite body 1 will be described, with reference to FIG. 2. Basically, this orientation control system 4 is comprised of an Earth sensor 4a, a closed loop signal processor 4b, and a wheel unit 4c. As is shown in FIG. 1, the Earth sensor 4a is attached to the outer wall of the satellite body 1, and the closed loop signal processor 4b and wheel unit 4c are arranged in the interior of the satellite body 1.

The Earth sensor 4a detects an orientation error angle $\theta_B$ by which the reference axis $X_B$ is shifted from the Earth center direction axis $X_{B0}$, converts the detected orientation error angle into an electric signal $S\theta_B$, and outputs this electric signal. The orientation error angle signal $S\theta_B$ is supplied to the closed loop signal processor 4b. On the basis of the orientation error angle signal $S\theta_B$, the closed loop signal processor 4b calculates the angular momentum required for correcting the error angle $\theta_B$, and produces an angular momentum command signal $H_{WC}$ which causes the wheel unit 4c to generate the angular momentum. The command signal $H_{WC}$ is supplied to the wheel unit 4c. The wheel unit 4c incorporates a reaction wheel, and generates the commanded angular momentum $H_W$, with the rotating direction and rotating speed of the reaction wheel controlled in accordance with the command signal $H_{WC}$. The angular momentum $H_W$ is generated in the same direction as the direction in which the error angle $\theta_B$ is generated, so that the orientation error angle $\theta_B$ is reduced to zero.

Next, the orientation control system 5 for the antenna 2 will be described. Basically, this orientation control system 5 is comprised of an RF sensor 5a, a closed loop signal processor 5b, and an antenna-driving mechanism 5c. The RF sensor 5a is attached to the outer face of the antenna, the closed loop signal processor 5b is arranged in the interior of the satellite body 1, and the antenna-driving mechanism 5c is provided for the coupling portion between the antenna 2 and the shaft 3, as is shown in FIG. 1.

On the side of the antenna 2, the RF sensor 5a detects an orientation error angle $\theta_A$ by which the directivity direction axis $X_A$ is shifted from the target direction axis $X_{A0}$ (along which a target wave reaches the antenna 2), converts the detected orientation error angle $\theta_A$ into an electric signal $S\theta_A$, and outputs this electric signal. The orientation error angle signal $S\theta_A$ is supplied to the closed loop signal processor 5b. On the basis of the orientation error angle signal $S\theta_A$, the closed loop signal processor 5b calculates the angular velocity required for correcting the error angle $\theta_A$, and produces a command signal $W_{APM}$ which causes the antenna-driving mechanism 5c to rotate the antenna 5 at the angular velocity. The command signal $W_{APM}$ is supplied to the antenna-driving mechanism 5c. The antenna-driving mechanism 5c rotates the antenna 2, with the rotation direction and the rotating speed being designated by the command signal $W_{APM}$. When the antenna-driving mechanism 5c is operated in accordance with the command signal $W_{APM}$, the antenna 2 is rotated in the opposite direction to that of the angle $\theta_A$ in such a manner that $\theta_{APM} = \theta_A$. Thus, the orientation error angle $\theta_A$ is reduced to zero.

The dynamic effects produced by the satellite body orientation control system 4 and the antenna orientation control system 5 are processed in a satellite dynamics section 6, as is shown in FIG. 2. What becomes a problem in this satellite dynamics section 6 are dynamic effects which the control performed by each control system may have on each other.

In the case where both orientation control systems 4 and 5 are in the initial condition, the reference axis $X_B$ of the satellite body 1 coincides with the Earth center direction axis $X_{B0}$ ($\theta_B = 0$), and the antenna directivity direction axis $X_A$ coincides with the target direction axis $X_{A0}$ ($\theta_A = 0$, $\theta_{APM} = \theta_{REF}$). Let it be assumed that, in this initial condition, a disturbance torque $T_E$ is applied to the satellite body 1. In this case, the angular momentum by which the disturbance torque $T_E$ varies the orientation of the satellite body 1 is obtained by subjecting the disturbance torque $T_E$ to $1/S$ calculation (S: Laplacian operator). The angular velocity $\dot{\theta}_B$ at which the orientation of the satellite body 1 is varied by the angular momentum is obtained by subjecting the angular momentum to $1/I$ calculation (I: total moment of inertia). The orientation error angle $\theta_B$ by which the orientation of the satellite body 1 is varied at the angular velocity $\dot{\theta}_B$ is obtained by subjecting the angular velocity $\dot{\theta}_B$ to $1/S$. In the satellite body orientation control system 4, the orientation error angle $\theta_B$ is detected by the Earth sensor 4a, and the wheel unit 4c generates a reaction wheel angular momentum $H_W$ having the same polarity as the angular momentum caused by the disturbance torque $T_E$. An orientation variation caused by the disturbance torque $T_E$ is suppressed by utilization of this reaction wheel angular momentum $H_W$.

If the orientation of the satellite body 1 is varied by $\theta_B$ due to the application of the external torque $T_E$, the orientation of the antenna 2 is also varied by $\theta_B$, as is apparent from FIG. 1. That is, in the satellite dynamics section 6, $\theta_B$ acts on the orientation control system 5 of the antenna 2 by way of a coupling term 7. Since, in the initial condition, the antenna directivity direction axis $X_A$ coincides with the target direction axis $X_{A0}$ ($\theta_A = 0$), $\theta_B$ causes an orientation error angle $\theta_A$. In the antenna orientation control system 5, the RF sensor 5a detects the orientation error angle $\theta_A$ (i.e., $\theta_B$), and the antenna 2 is rotated at an angular velocity of $\dot{\theta}_{APM}$ such that the detected error angle $\theta_A$ is reduced to zero. The antenna-driving angle $\theta_{APM}$ at the time is obtained by subjecting the angular velocity $\dot{\theta}_{APM}$ to $1/S$ calculation. The value of the antenna-driving angle is equivalent to that of $\theta_B$, but the direction thereof is opposite to that of $\theta_B$. Accordingly, the antenna-driving angle $\theta_{APM}$ cancels $\theta_B$ and thus coincides with the directivity target angle $\theta_{REF}$. As a result, $\theta_A$ is reduced to zero.

If the orientation of the antenna 2 is controlled in the manner mentioned above, then the angular velocity $\dot{\theta}_{APM}$ of the antenna 2 has effects on the satellite body 1. That is, the mathematical product obtained by multiplying the angular velocity $\dot{\theta}_{APM}$ with $I_A$ ($I_A$: antenna's equivalent moment of inertia) acts, as an angular momentum, on the orientation control system 4 of the satellite body 1 by way of a coupling term 8. Since this angular momentum varies the orientation of the satellite body 1, just like the angular momentum caused by the disturbance torque $T_E$, an orientation error angle $\theta_B$ is detected and controlled again in the orientation control system 4. Since similar control is repeated, the orientation control system 4 of the satellite body 1 and the orientation control system 5 of the antenna 2 are dynamically affected with reference to each other, resulting in mutual interference.

In consideration of the above, the present invention provides a construction for canceling the coupling terms 7 and 8 mentioned above.

Specifically, the following structural components are added to the antenna orientation control system 5: an estimation section 5d for estimating a directivity target angle; a compensation section 5e for compensating for the orientation error angle of a satellite body; subtracters 5h and 5g; and an $\hat{I}_A$ calculation section 5f. The estimation section 5d estimates a directivity target angle on the basis of the present position and the formula which expresses the orbit of a revolving satellite (i.e., a target), encodes the estimated directivity target angle, and outputs the resultant signal as a directivity target angle estimation signal $S\hat{\theta}_{REF}$. This estimation signal $S\hat{\theta}_{REF}$ is supplied to subtracter 5g. A signal $S\theta_B$ which the Earth sensor 4a of the satellite body orientation control system 4 detects as representing an orientation error angle of the satellite body is supplied to subtracter 5g. Thus, subtracter 5g subtracts $S\hat{\theta}_{REF}$ from $S\theta_B$. The result of this subtraction corresponds to the orientation error angle of the antenna 2 in the case where the orientation of the satellite body 1 is shifted by $\theta_B$.

The orientation error angle signal of the antenna 2 is supplied to the compensation section 5e. This compensation section 5e differentiates the orientation error angle signal, to thereby obtain the angular velocity of the error angle. Further, the compensation section 5e averages the angular velocity, and outputs the result as a compensation signal $S\dot{\theta}_{APM}$, to use it for correcting the antenna directivity angle. The compensation signal $S\dot{\theta}_{APM}$ is supplied to subtracter 5h.

The subtracter 5h subtracts the compensation signal $S\dot{\theta}_{APM}$ from the command signal $W_{APM}$ supplied from the closed loop signal processor 5b to the antenna-driving mechanism 5c. It should be noted that the RF sensor 5a does not detect an error angle $\theta_A$ until the antenna directivity direction axis $X_A$ is shifted from the target direction axis $X_{A0}$ to a certain extent. Therefore, a command signal has not yet been output from the closed loop signal processor 5b when the compensation signal $S\dot{\theta}_{APM}$ is supplied to the subtracter 5g. However, since the directivity target angle estimation signal $S\hat{\theta}_{REF}$ is continuously calculated and output, the compensation signal $S\dot{\theta}_{APM}$ is immediately output, if the orientation of the satellite body 1 varies and an error angle $\theta_B$ caused. Therefore, the compensation signal $S\dot{\theta}_{APM}$ is supplied to the antenna-driving mechanism 5c as a command signal $W_{APM}$. At the time, the antenna 2 is rotated at an angular velocity of $\dot{\theta}_{APM}$, and 1/S calculation of this angular velocity $\dot{\theta}_{APM}$ is $\theta_{APM} = -\theta_B + \theta_{REF}$. As is apparent from the satellite dynamics section 6 illustrated in FIG. 2, the antenna orientation error angle $\theta_A$ is $\theta_B - \theta_{REF} + \theta_{APM}$. Therefore, if the compensation signal $S\dot{\theta}_{APM}$ causes the antenna 2 to be rotated $-\theta_B + \theta_{REF}$, the antenna orientation error angle $\theta_A$ can be reduced to zero. In this manner, it is possible to reduce the dynamic effects which the orientation control of the satellite body 1 has on the orientation control of the antenna 2 due to the coupling term 7.

The compensation signal $S\dot{\theta}_{APM}$ is also supplied to the $\hat{I}_A$ calculation section 5f. In this $\hat{I}_A$ calculation section 5f, the compensation signal $S\dot{\theta}_{APM}$ is multiplied with an estimation value $\hat{I}_A$ of the antenna's equivalent moment of inertia $I_A$, to thereby calculate the effects which the orientation control performed for the antenna 2 has on the orientation control performed for the satellite body 1, i.e., the angular momentum corresponding to the coupling term 8. The result of this calculation is supplied to the orientation control system 4 of the satellite body 1 as a compensation signal used for compensating for the coupling term 8. The estimation value $\hat{I}_A$ mentioned above is derived from both the mass property of the antenna 2 and the antenna-driving angle $\theta_{APM}$.

In the present invention, the satellite body orientation control system 4 is provided with an adder 4d. This adder 4d adds the compensation signal produced by the $\hat{I}_A$ calculation section of the antenna orientation control system 5 to the angular momentum command signal $H_{WC}$ supplied from the closed loop signal processor 4b to the wheel unit 4c. Since the command signal is supplied to the wheel unit 4c, with the compensation signal added thereto, the wheel unit 4c generates an angular momentum made up of the normal angular momentum component and the angular momentum component corresponding to the compensation signal. The angular momentum component added to the normal angular momentum has a value equivalent to that of the angular momentum caused by the coupling term 8 but its polarity is opposite to that of the angular momentum caused by the coupling term 8. Therefore, the added angular momentum component and the angular momentum component caused by the coupling term 8 cancel each other. Accordingly, it is possible to reduce the dynamic effects which the orientation control performed for the antenna 2 has on the orientation control performed for the satellite body 1 due to the coupling term 8.

As mentioned above, the orientation control apparatus calculates a compensation signal on the basis of the data on the orientation angle of the satellite body 1 and of the data on the antenna directivity target angle estimation signal, and uses the compensation signal for compensating for the coupling terms 7 and 8 of the dynamics section 6 of the orientation control systems 4 and 5. In this manner, the interference between the orientation control systems 4 and 5 is prevented. Since the interference between the two orientation control systems is prevented with no need to keep the control bands of the two systems sufficiently apart from each other, the design and manufacture of the orientation control apparatus are easy. In addition, the orientation control apparatus permits the satellite to employ a large-sized antenna. Moreover, since the control performed by each control system of the apparatus is simple, the power consumption of the apparatus is small.

Figure 3:
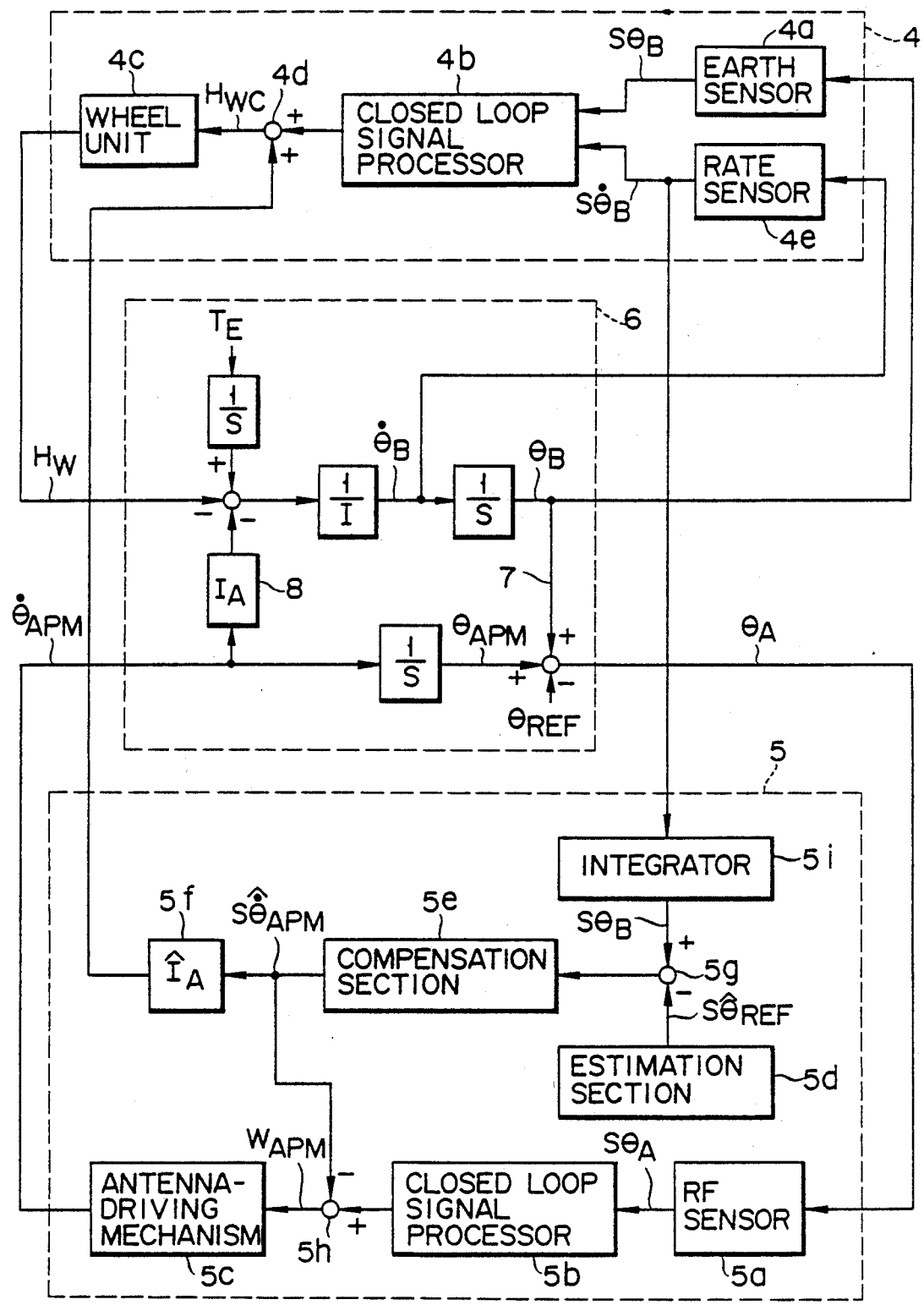
FIG. 3 is a block diagram showing the circuit arrangement of an orientation control apparatus according to the second embodiment of the present invention.

In the space vehicles of some types, the orientation control system 4 for the satellite body 1 is provided with a rate sensor 4e, as is shown in FIG. 3. This rate sensor 4e detects an angular velocity $\dot{\theta}_B$ of an orientation variation of the satellite body 1, and converts it into an electric signal $S\dot{\theta}_B$ for output. The angular velocity signal $S\dot{\theta}_B$ is supplied to the closed loop signal processor 4b. In this closed loop processor 4b, the angular velocity signal $S\dot{\theta}_B$ is processed together with the orientation error angle signal $S\theta_B$ supplied from the Earth sensor 4a, so as to generate a wheel angular momentum command signal $H_{WC}$ (which means a signal commanding an angular momentum to be generated by the wheel and by which an error angle is corrected).

As may be understood from the above, the output $S\dot{\theta}_B$ of the rate sensor 4d corresponds to the angular velocity $\dot{\theta}_B$ of the orientation error angle $\theta_B$. Therefore, the output $S\dot{\theta}_B$ of the rate sensor 4d can be used as a compensation signal for compensating for the coupling term 7. In the embodiment shown in FIG. 3, the antenna orientation control system 5 comprises an integrator 5i. A signal $S\theta_B$ corresponding to the orientation error angle $\theta_B$ of the satellite body is obtained by integrating the output $S\dot{\theta}_B$ of the rate sensor 4e by use of the integrator 5i, and is supplied to subtracter 5g. By so doing, it is possible for the embodiment shown in FIG. 3 to achieve similar advantages to those of the embodiment shown in FIG. 2. In FIG. 3, the structural components which are similar to those shown in FIG. 2 are indicated by the same reference numerals as used in FIG. 2, and reference to them will be omitted herein.

Figure 4:
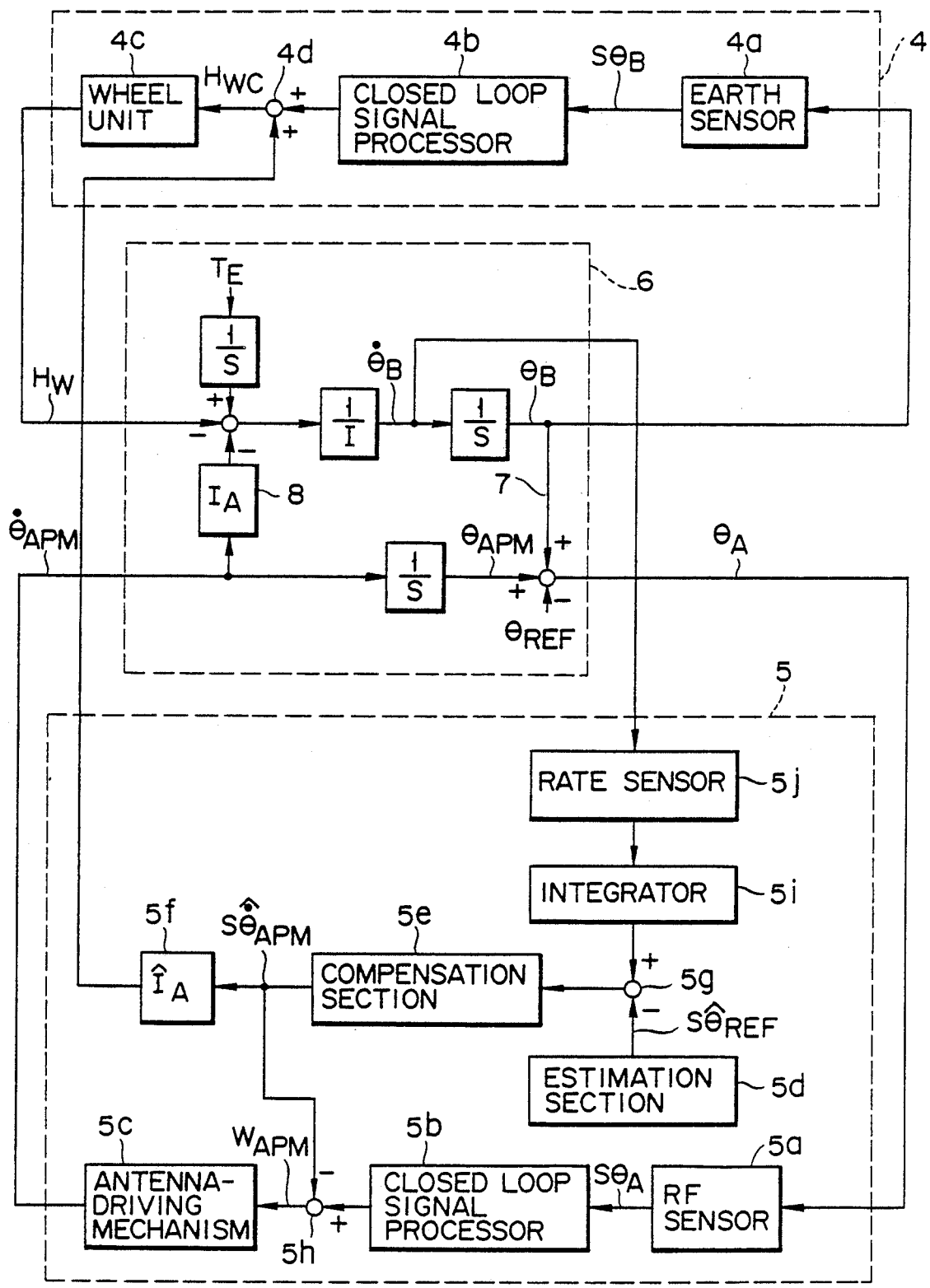
FIG. 4 is a block diagram showing the circuit arrangement of an orientation control apparatus according to the third embodiment of the present invention.

The embodiment shown in FIG. 3 was described, referring to the case where the rate sensor was provided for the satellite body orientation control system 4. However, a rate sensor 5j may be provided for the antenna orientation control system 5, as is shown in FIG. 4, as long as the rate sensor 5j is not used for the control of the satellite body orientation.

Figure 5:
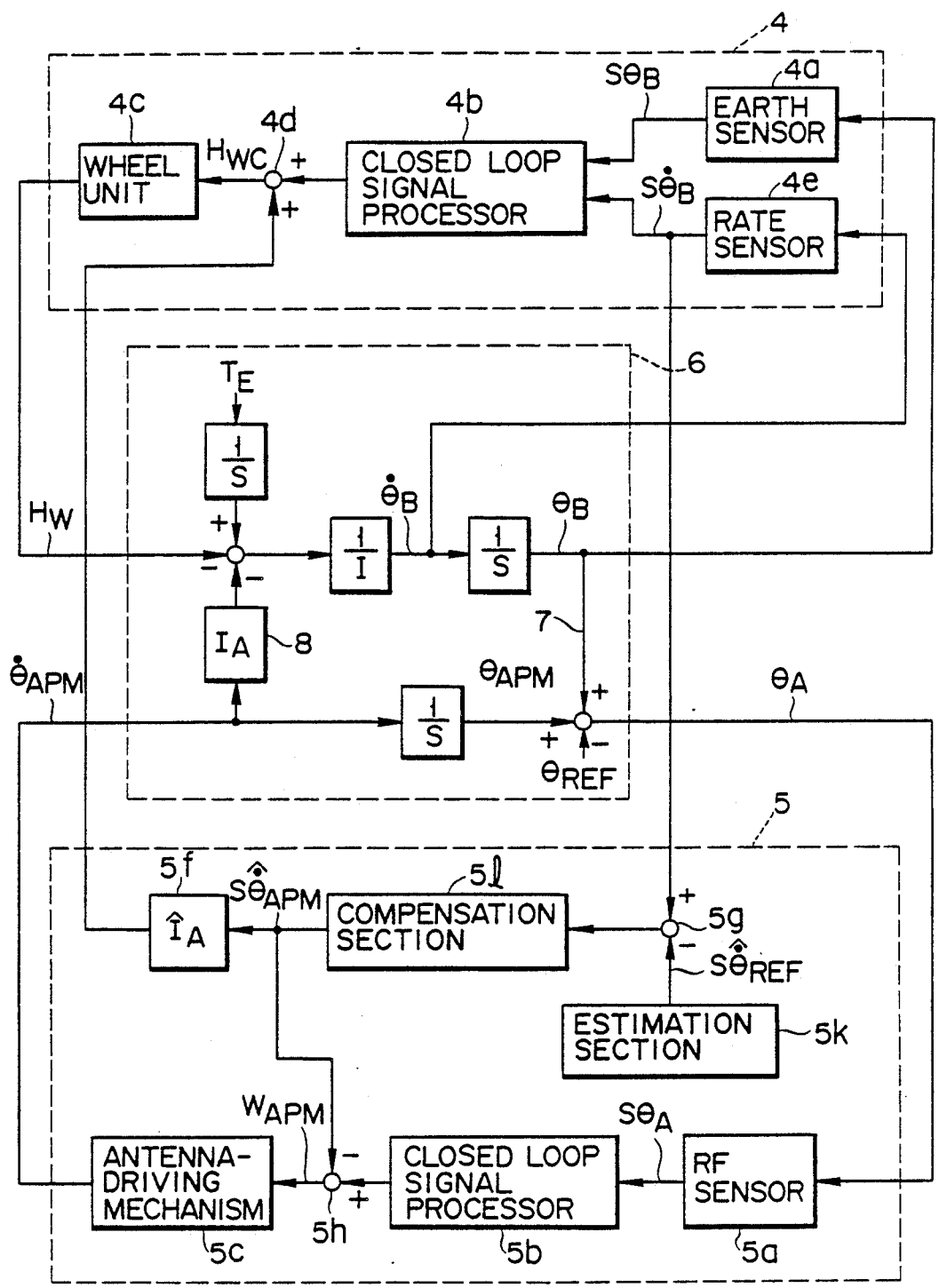
FIG. 5 is a block diagram showing the circuit arrangement of an orientation control apparatus according to the fourth embodiment of the present invention.

The rate sensor 4e shown in FIG. 3 is designed to produce an angular velocity signal $S\dot{\theta}_B$. In the antenna orientation control system 5, therefore, the estimation section 5d may be replaced with a variation rate estimation section 5k (which estimates a variation rate of the directivity target angle of the antenna), and the compensation section 5e may be replaced with a variation rate compensation section 5 l (which compensates for a variation rate of the orientation of the satellite body), as is shown in FIG. 5. If the variation rate estimation section 5k and the variation rate compensation section 5 l are employed in the manner shown in FIG. 5, an output of the rate sensor 4e can be used without being processed. In this case, the variation rate estimation section 5k differentiates the directivity target angle estimation signal $S\hat{\theta}_{REF}$ and outputs the differentiated signal as a variation rate (angular velocity) estimation signal $S\hat{\dot{\theta}}_{REF}$, and subtracter 5g subtracts $S\hat{\dot{\theta}}_{REF}$ from the angular velocity signal $S\dot{\theta}_B$ of an orientation variation of the satellite body 1 (the angular velocity signal $S\dot{\theta}_B$ being output from the rate sensor 4e). In this manner, the angular velocity signal corresponding to the antenna's orientation variation caused by the satellite body's orientation variation is derived.

The angular velocity signal, thus derived, is supplied to the variation rate compensation section 5 l. This compensation section 5 l multiplies the input angular velocity signal with a predetermined coefficient, to thereby produce a compensation signal $S\dot{\theta}_{APM}$. The compensation signal $S\dot{\theta}_{APM}$ corresponds to the angular velocity of the antenna orientation variation occurring in relation to the satellite body orientation variation. The compensation signal $S\dot{\theta}_{APM}$ is equivalent to an output of the compensation section 5e shown in FIG. 3. Therefore, the embodiment shown in FIG. 5 produces advantages similar to those of the FIG. 3 embodiment by supplying the compensation signal $S\dot{\theta}_{APM}$ to subtracter 5h.

Since the structural components employed in the embodiment shown in FIG. 5 are similar to those shown in FIG. 3, except for the portions mentioned above, they are represented by the same reference numerals as used in FIG. 3, and reference to them will be omitted herein.

Figure 6:
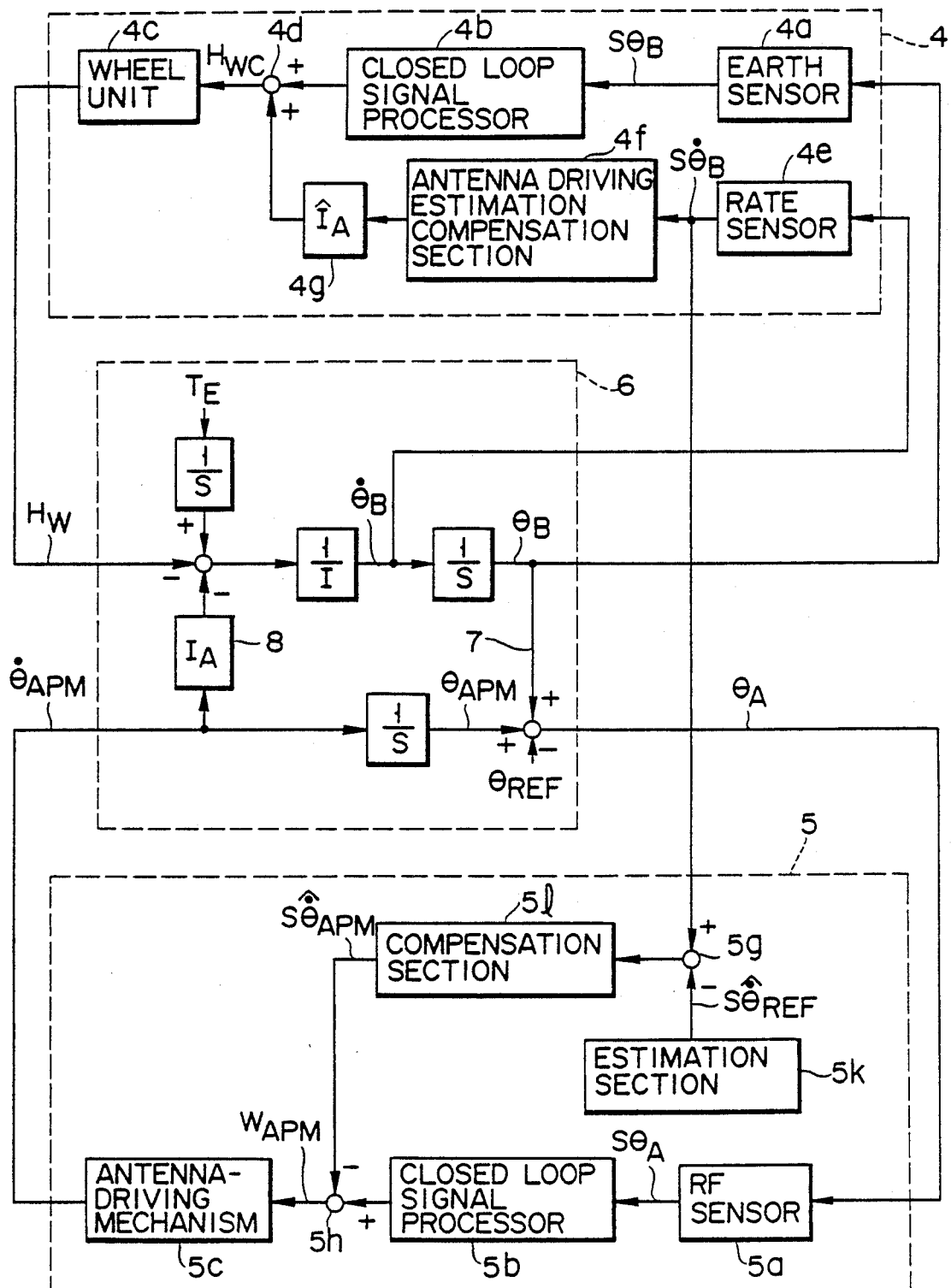
FIG. 6 is a block diagram showing the circuit arrangement of an orientation control apparatus according to the fifth embodiment of the present invention.

The embodiment shown in FIG. 3 may be modified in the manner shown in FIG. 6. In FIG. 6, the structural components which are similar to those shown in FIG. 3 are indicated by the same reference numerals as used in FIG. 3, and reference to them will be omitted herein.

In the modification shown in FIG. 6, an antenna driving compensation estimation section 4f (i.e., an estimation section for estimating a compensation value used for the compensation of a variation which occurs in the orientation of the satellite body as a result of the driving of the antenna 2) and an $\hat{I}_A$ calculation section 4g are added to the satellite body orientation control system 4, and the $\hat{I}_A$ calculation section 5f shown in FIG. 3 is removed from the antenna orientation control system 5. The angular velocity signal $S\dot{\theta}_B$ which the rate sensor 4e produces due to a satellite body orientation variation is supplied to the estimation section 4f. On the basis of the angular velocity signal $S\dot{\theta}_B$, the estimation section 4f determines the extent of variation which the antenna 2 undergoes due to a variation in the orientation of the satellite body 1, calculates an antenna driving angular velocity value (i.e., an angular velocity value caused as a result of the driving of the antenna 2) required for canceling the variation, and outputs the calculated value as a compensation signal. This compensation signal is supplied to the $\hat{I}_A$ calculation section 4g. Like the $\hat{I}_A$ calculation section 5g shown in FIG. 3, the calculation section 4g multiplies the input compensation signal with an estimation value $\hat{I}_A$ of the antenna's equivalent moment of inertia $I_A$, to thereby calculate how the orientation of the satellite body 1 is affected by the orientation control of the antenna 2 (i.e., the angular momentum corresponding to the coupling term 8).

The result of this calculation is supplied to the adder 4d as a compensation signal used or compensating for the coupling term 8. The adder 4d adds the compensation signal to the angular momentum command signal $H_{WC}$ supplied from the closed loop signal processor 4b to the wheel unit 4c. Since the command signal is supplied to the wheel unit 4c, with the compensation signal added thereto, the wheel unit 4c generates an angular momentum made up of the normal angular momentum component and the angular momentum component corresponding to the compensation signal. The angular momentum component added to the normal angular momentum has a value equivalent to that of the angular momentum caused by the coupling term 8 but its polarity is opposite to that of the angular momentum caused by the coupling term 8. Therefore, the added angular momentum component and the angular momentum caused by the coupling term 8 cancel each other. Accordingly, it is possible to reduce the dynamic effects which the orientation control of the antenna 2 has on the orientation control of the satellite body 1 due to the coupling term 8.

The foregoing embodiments were described, referring to the case where an antenna was provided for the geostationary satellite. However, the present invention is in no way limited to this case, and may be applied to the cases where a control device required of orientation control, such as a solar paddle or an observation instrument, is provided for the satellite body. Moreover, the object to which the antenna should be directed is not limited to a satellite revolving around the Earth, and may be an Earth station, a space station, or the like. Needless to say, however, the advantages of the present invention are most remarkable in the cases where the antenna directivity direction is continuously changed.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An orientation control apparatus for a space vehicle, comprising:
   a first orientation control system for controlling the orientation of a main body of the space vehicle on the basis of information representing a variation in the orientation of the main body;
   a second orientation control system for controlling the orientation of a device provided on the main body on the basis of information representing a variation in the orientation of the device;
   a first estimation section for estimating a target direction of the device;
   a second estimation section for estimating an orientation error of the device on the basis of information representing the target direction estimated by the first estimation section and on the basis of information obtained by the first orientation control system and representing a variation in the orientation of the main body;
   a first compensation means for correcting the operation of the second orientation control system on the basis of the orientation error estimated by the second estimation section, thereby compensating for dynamic effects which the first orientation control system may have on the second orientation control system; and
   a second compensation means for correcting the operation of the first orientation control system on the basis of the estimated orientation error, thereby compensating for dynamic effects which the second orientation control system may have on the first orientation control system when the first compensation means performs compensation.

2. An orientation control apparatus according to claim 1, wherein said first orientation control system includes a first detection means for detecting an orientation variation of the main body as an error angle; a first signal processor for producing a driving control signal on the basis of the error angle detected by the first orientation error angle detection means, such that the driving control signal can be used for canceling the error angle; and a first actuator, driven on the basis of the driving control signal produced by the first signal processor, for varying the orientation of the main body;
   said second orientation control system includes a second detection means for detecting an orientation variation of the device with reference to the information representing the target direction as an error angle; a second signal processor for producing a driving control signal on the basis of the error angle detected by the second orientation error angle detection means, such that the driving control signal can be used for canceling the error angle; and a second actuator, driven on the basis of the driving control signal produced by the second signal processor, for varying the orientation of the device;
   said first estimation section constantly estimates a target angle of the device and outputs an estimated value of the target angle;
   said second estimation section includes a subtractor for calculating a difference between a signal representing the error angle detected by the first orientation error angle detection means and the estimated value of the target angle obtained by the first estimation section, said second estimation section estimating, on the basis of an output of the subtractor, an angle by which the orientation of the device is varied as a result of an orientation variation of the main body;
   said first compensation means includes compensation signal generation means for generating a compensation signal which is used for compensating for the driving control of the device in accordance with the angle estimated by the second estimation section, and subtraction means for subtracting the compensation signal generated by the compensation signal generating means from the driving control signal produced by the second signal processor; and
   said second compensation means includes an estimation section for estimating effects which an orientation variation of the device may have on the main body by multiplying the compensation signal obtained by the first compensation means with an equivalent moment of inertia of the device; and an adder means for adding an output of the estimation section to the driving control signal produced in the first orientation control system.

3. An orientation control apparatus according to claim 1, wherein said first orientation control system includes a first angular velocity detection means for detecting an angular velocity of an orientation variation of the main body and outputting the detected angular velocity as angular velocity information; a first signal processor for producing a driving control signal on the basis of the angular velocity information output by the orientation angular velocity detection means, such that the driving control signal can be used for canceling the angular velocity; and a first actuator, driven on the basis of the driving control signal produced by the first signal processor, for varying the orientation of the main body;
   said second orientation control system includes an error angle detection means for detecting an orientation angle of the device with reference to a target angle as error angle information; a second signal processor for producing a driving control signal on the basis of the error angle information detected by the orientation error angle detection means, such that the driving control signal can be used for canceling the error angle; and a second actuator, driven on the basis of the driving control signal produced by the second signal processor, for varying the orientation of the device;
   said first estimation section constantly estimates a target angle of the device and outputs an estimated value of the target angle;
   said second estimation section includes an integrator for integrating the angular velocity information output by the orientation angular velocity detection means so as to convert the angular velocity information into angular information, and a subtractor for calculating a difference between an output of the integrator and the estimated value of the target angle obtained by the first estimation section, said second estimation section estimating, on the basis of an output of the subtractor, an angle by which the orientation of the device is varied as a result of an orientation variation of the main body;

said first compensation means includes compensation signal generation means for generating a compensation signal which is used for compensating for the driving control of the device in accordance with the angle estimated by the second estimation section, and subtraction means for subtracting the compensation signal generated by the compensation signal generating means from the driving control signal produced by the second signal processor; and said second compensation means includes an estimation section for estimating effects which an orientation variation of the device may have on the main body by multiplying the compensation signal obtained by the first compensation means with an equivalent moment of inertia of the device; and an adder means for adding an output of the estimation section to the driving control signal produced in the first orientation control system.

4. An orientation control apparatus according to claim 1, wherein said first orientation control system includes an orientation angular velocity detection means for detecting an angular velocity of an orientation variation of the main body and outputting the detected angular velocity as angular velocity information; a first signal processor for producing a driving control signal on the basis of the angular velocity information output by the orientation angular velocity detection means, such that the driving control signal can be used for canceling the angular velocity; and a first actuator, driven on the basis of the driving control signal produced by the first signal processor, for varying the orientation of the main body;

said second orientation control system includes an orientation error angle detection means for detecting an orientation angle of the device with reference to a target angle as error angle information; a second signal processor for producing a driving control signal on the basis of the error angle information detected by the orientation error angle detection means, such that the driving control signal can be used for canceling the error angle; and a second actuator, driven on the basis of the driving control signal produced by the second signal processor, for varying the orientation of the device;

said first estimation section constantly estimates a variation rate of the target angle of the device and outputs an estimated value of the variation rate of the target angle;

said second estimation section includes a subtractor for calculating a difference between the angular velocity information output by the orientation angular velocity detection means and the estimated value of the variation rate of the target angle, said second estimation section estimating, on the basis of an output of the subtractor, an angle by which the orientation of the device is varied as a result of an orientation variation of the main body;

said first compensation means includes compensation signal generation means for generating a compensation signal which is used for compensating for the driving control of the device in accordance with the angle estimated by the second estimation section, and subtraction means for subtracting the compensation signal generated by the compensation signal generating means from the driving control signal produced by the second signal processor; and said second compensation means includes an estimation section for estimating effects which an orientation variation of the device may have on the main body by multiplying the compensation signal obtained by the first compensation means with an equivalent moment of inertia of the device; and adder means for adding an output of the estimation section to the driving control signal produced in the first orientation control system.

5. An orientation control apparatus according to claim 1, wherein said first orientation control system includes an orientation error angle detection means for detecting an orientation variation of the main body as error angle information; a first signal processor for producing a driving control signal on the basis of the angular velocity information output by the orientation error angle detection means, such that the driving control signal can be used for canceling the error angle; and a first actuator, driven on the basis of the driving control signal produced by the first signal processor, for varying the orientation of the main body;

said second orientation control system includes second orientation error angle detection means for detecting an orientation variation of the device with reference to a target angle as error angle information; a second signal processor for producing a driving control signal on the basis of the error angle information detected by the second orientation error angle detection means, such that the driving control signal can be used for canceling the error angle; and a second actuator, driven on the basis of the driving control signal produced by the second signal processor, for varying the orientation of the device;

said first estimation section constantly estimates a variation rate of the target angle of the device and outputs an estimated value of the variation rate of the target angle;

said second estimation section includes an orientation angular velocity detection means for detecting an angular velocity of the orientation variation of the main body and outputting the detected angular velocity as angular velocity information, a subtractor for calculating a difference between the angular velocity information output by the orientation angular velocity detecting means and the estimated value of the variation rate of the target angle, said second estimation section estimating on the basis of an output of the subtractor, an angle by which the orientation of the device is varied as a result of an orientation variation of the main body;

said first compensation means includes compensation signal generation means for generating a compensation signal which is used for compensating for the driving control of the device in accordance with the angle estimated by the second estimation section, and subtraction means for subtracting the compensation signal generated by the compensation signal generating means from the driving control signal produced by the second signal processor; and said second compensation means includes a compensation section for estimating an angular velocity at which the orientation of the main body is varied as a result of the orientation variation of the device, by use of the angular velocity information obtained by the orientation angular velocity detection means and for outputting an estimated value of the angular velocity as an angular velocity compensation signal; an estimation section for estimating effects which an orientation variation of the device may have on the main body by multiplying the angular velocity compensation signal obtained by the driving estimation compensation section with an equivalent moment of inertia of the device; and adder means for adding an output of the estimation section to the driving control signal produced in the first orientation control system.

* * * * *